(No Model.)

A. WÖRNER.
DRIVE CHAIN.

No. 486,920. Patented Nov. 29, 1892.

Witnesses:
William Paton
Timothy F. Dillon

Inventor
Adolf Wörner
by Geo. H. Benjamin
Attorney.

THE NORRIS PETERS CO., PHOTO-LITHO., WASHINGTON, D. C.

UNITED STATES PATENT OFFICE.

ADOLF WÖRNER, OF BUDA-PESTH, AUSTRIA-HUNGARY, ASSIGNOR TO SIEMENS & HALSKE, OF BERLIN, GERMANY.

DRIVE-CHAIN.

SPECIFICATION forming part of Letters Patent No. 486,920, dated November 29, 1892.

Application filed June 20, 1892. Serial No. 437,246. (No model.)

*To all whom it may concern:*

Be it known that I, ADOLF WÖRNER, a subject of the Emperor of Germany, residing at Buda-Pesth, Austria-Hungary, have invented new and useful Improvements in Drive-Chains, of which the following is a specification.

This invention relates to drive-chains, and has for its principal object the production of a drive-chain of great durability, flexibility, and simplicity, thus providing a construction highly suitable for transmitting motion to electric motors on moving vehicles and in other applications.

Generally the character of my improved drive-chain is such that the frictional strain exerted on the link cross-bars is uniformly distributed throughout the length of the same. Further, said improved chain is adapted to receive at a point of its travel a lubricant, which will be interiorly fed by the cross-bars to the side bearings, thus insuring the free and noiseless working of the parts and avoiding undue wear.

Figure 1:
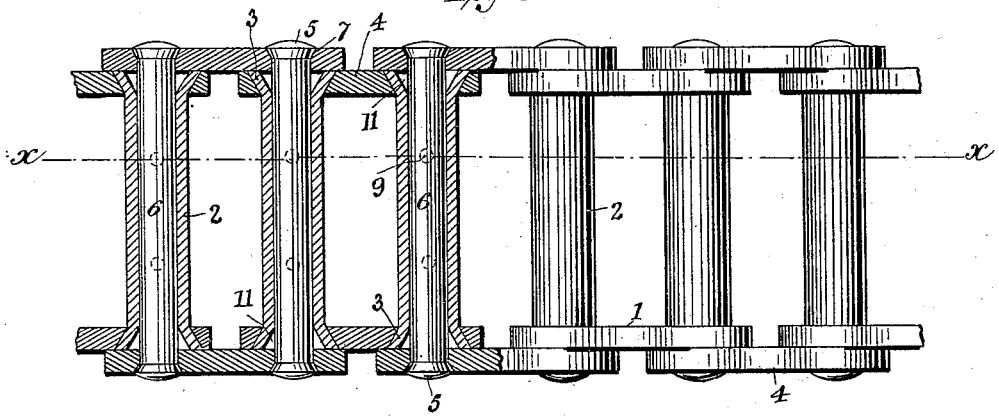
Figure 2:
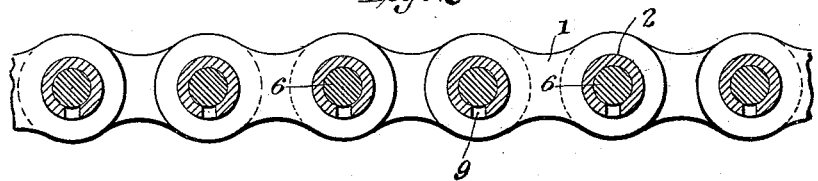
Figure 3:
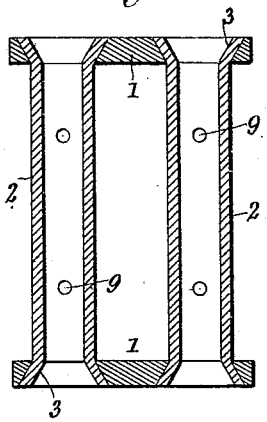
Figure 6:
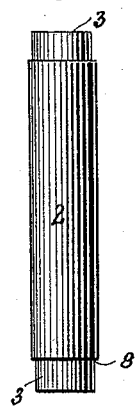
Figure 4:
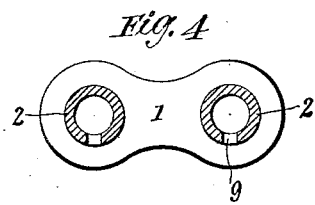
Figure 5:
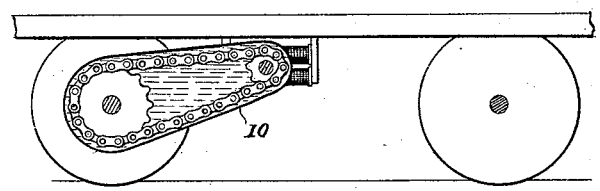

In the drawings accompanying this specification, Figure 1 is a plan view, partly in section, of my improved drive-chain. Fig. 2 is a longitudinal sectional view of the same, taken in the plane indicated by the dotted line $xx$, Fig. 1. Figs. 3 and 4 are a sectional plan and longitudinal sectional view, respectively, showing in detail one of the links. Fig. 5 is a longitudinal sectional view of so much of an electro-locomotive as may be necessary to illustrate the automatic lubricating feature of my invention; and Fig. 6 is another detail view, one of the tubular cross-bars being shown in a slightly-modified form.

As will be noted, the improved chain consists of a series of specially-formed links peculiarly attached to each other. Each link consists of parallel side plates 1 1, preferably of the shape shown in Figs. 2 and 4, and a pair of tubular cross-bars 2 2. These latter are connected to the side plates 1 1 by having their terminal portions 3 3 seated and expanded in conical openings in said side plates to rigidly connect and relatively brace the same. Links thus formed are pivotally connected together by means of link-connecting plates 4 4, engaged by the heads 5 5 of rivet-bolts 6 6. By reference to Fig. 1 it will be seen that the inner portions 7 7 of the heads 5 5 are of conical form to seat snugly in corresponding openings therefor in the plates 4 4.

From the foregoing description it will be clear that the independent links are not only durably and simply formed, but easily connected together to present a drive-chain in which the frictional strain is uniformly distributed throughout and sustained by the rivet-bolts, and the side connections are such that they will be able to successfully resist the increased strain at such points. By having the inner tapering sides 7 of the rivet-bolts seated as described heads of the desired strength can be employed, and yet not objectionably project at the sides of the chain. The arrangement is such that the tubular cross-bars 2 and contained bolts 6 are the only transverse parts of the chain, the relation and position being such that a tooth-recess is provided on opposite sides of each cross-bar and all of the recesses of a corresponding width. The chain will therefore regularly engage the successive teeth of the sprocket-wheel, and hence transmit a uniform movement. Evenness of movement is further assured by having the plates 4 4 correspond in shape with the plates 1 1. Under some circumstances I may reduce the terminal portions 3 of each tubular cross-bar to secure annular shoulders 8 8, Fig. 6, designed to bear against the inner sides of the plates 1 1 when the terminals 3 are introduced and expanded within the tapering openings of said plates.

With a view of securing the free and noiseless working of the chain I provide each tubular cross-bar with one or more perforations 9 (two being indicated and preferably located on the under side) so disposed that when said bars reach the lower position of the chain travel they will move along a receptacle or conduit 10, containing oil, a suitable quantity of which will pass through said openings 9 to the interior of the tubular bars and feed laterally to the side bearings and connections.

The side spaces 11 11 between the expanded terminal portions 3 3 and rivet-bolts 6 serve as oil receiving and retaining chambers, and insure at all times the maintenance of a proper quantity of oil.

I claim—

1. The combination, in a drive-chain, of links having cross-bars and link-connecting parts arranged at each side, said links being provided with distinct lubricating-chambers at each side adjacent to the engagement of the link-connecting parts, substantially as described.

2. The combination, in a drive-chain, of links having cross-bars and link-connecting parts arranged at each side, said links being provided with distinct lubricating-chambers at each side adjacent to the engagement of the link-connecting parts and said cross-bars being provided with oil-admission openings and ducts or passages to convey the oil to the link-connecting parts of the chain, substantially as described.

3. The combination, in a drive-chain, of links comprising side plates provided with tapering perforations and tubular cross-bars seated and expanded in said perforations and provided with an oil-admission opening, together with bolts passing through the cross-bars and engaging link-connecting plates, the expanded portions of the cross-bars presenting oil-collecting chambers, substantially as described.

In testimony whereof I have, this 20th day of November, 1891, signed my name to this specification in the presence of two subscribing witnesses.

ADOLF WÖRNER.

Witnesses:
 WILLIAM PAXTON,
 TIMOTHY F. DILLON.